Figures 1, 2, 3, 4:
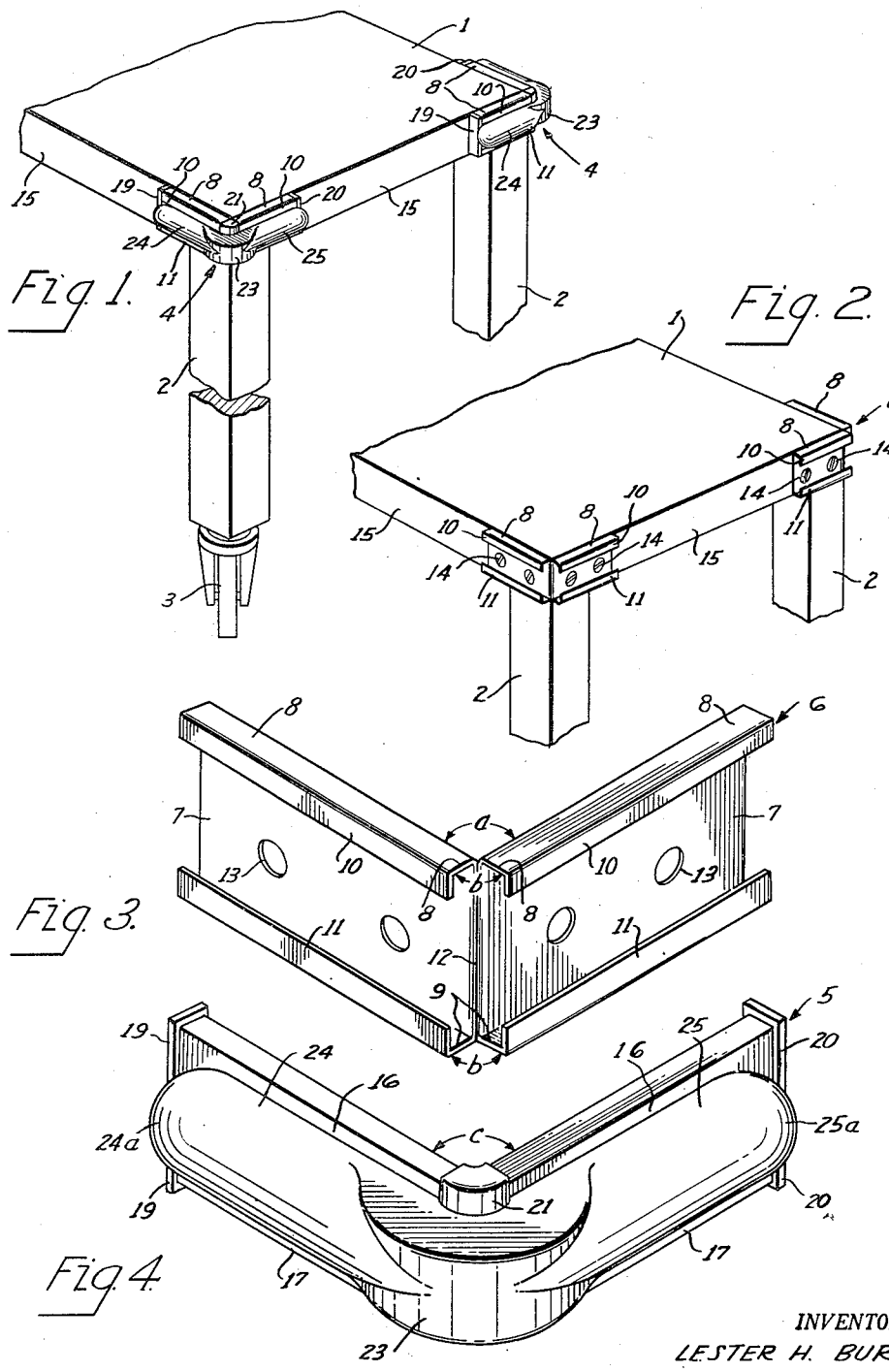

Aug. 3, 1954 — L. H. BURR — 2,685,147
CORNER BUMPER

Filed Jan. 8, 1952 — 2 Sheets-Sheet 1

INVENTOR.
LESTER H. BURR
BY Bosworth & Sessions
ATTORNEYS.

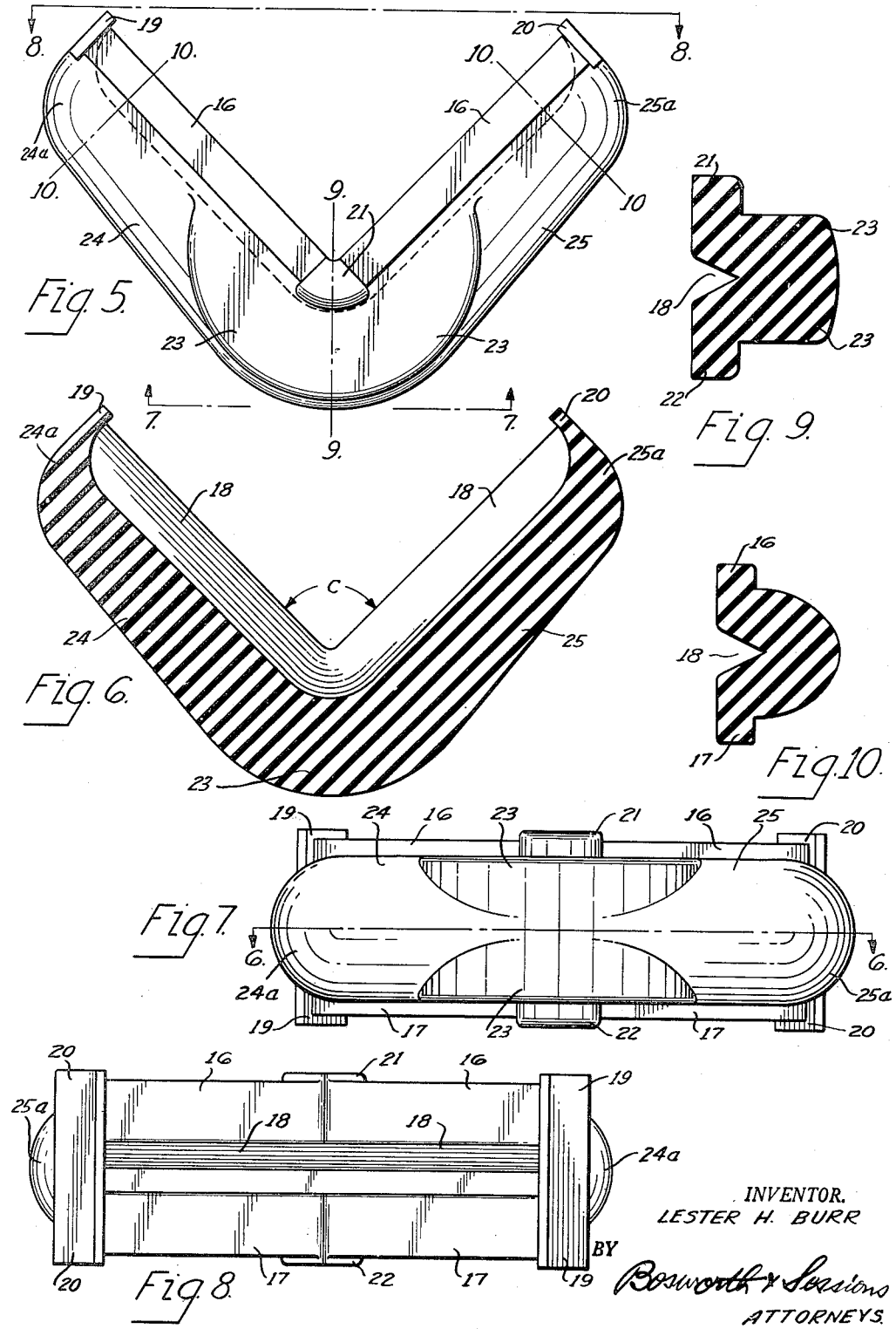

Patented Aug. 3, 1954

2,685,147

UNITED STATES PATENT OFFICE 2,685,147

CORNER BUMPER

Lester H. Burr, Elyria, Ohio, assignor, by mesne assignments, to The Colson Corporation, Elyria, Ohio, a corporation of Ohio Application January 8, 1952, Serial No. 265,383

4 Claims. (Cl. 45—137)

This invention relates to a corner bumper assembly for furniture, hand trucks, institutional trucks, etc., and, in particular, to a corner bumper assembly of the snap-in type.

Corner bumper assemblies have been known heretofore, but such corner bumper assemblies have required the use of exposed mounting channels of metal that are capable of doing damage to walls, woodwork, etc. or have been vulcanized to concealed metal inserts or partially concealed metal mounting members in such manner that the insert or mounting member must be discarded with the bumper element when the bumper element is no longer useful or else have lacked metal mounting members entirely. In all or virtually all such cases, the corner bumper assemblies have been attached by passing a plurality of screws through the body of the bumper element, the presence of screw holes or screw heads revealing where and how the bumper element is held in place and the whole being inherently insecure and always inviting the hazard of exposing the screw heads to defeat the purpose of the bumper.

It is an object of the present invention to obviate the undesirable features of the corner bumper assemblies of the prior art, doing so by providing a corner bumper assembly of the snap-in type. A particular object is to provide an attractive corner bumper assembly lacking unsightly mounting holes in the bumper element. A further object is to provide a corner bumper assembly in which the bumper element bodily covers the screws or other mounting elements, acting as a retainer for them and preventing them from becoming exposed or working out sufficiently to permit them to scratch walls, woodwork, etc. Another object is to dispense with exposed metal channels, metal inserts, and metal mounting means to which the body of the bumper element is vulcanized. Still another object of the invention is to provide a bumper element for a corner bumper assembly the ends of which may readily be squared off to permit them to mate with longitudinally extending strip bumpers used between corners on the sides and/or ends of the table or other item to which the corner bumper assembly is to be applied.

Other objects and advantages of the invention will be apparent from the description which follows and from the accompanying drawings, in which Figure 1 is an isometric representation on a greatly reduced scale of one end of a caster-mounted table provided with corner bumper assemblies of the kind made possible by the present invention. Figure 2 is a similar view of the same table without the bumper element but showing the mounting member which, together with the bumper element, goes to make up the corner bumper assembly of the invention. Figure 3 is an isometric representation on full scale of the mounting member itself. Figure 4 is an isometric representation on full scale of the bumper element. Figure 5 is a top plan of the bumper element. Figure 6 is a corresponding horizontal section as seen from line 6—6 of Figure 7. Figure 7 is an end elevation of the bumper element as seen from line 7—7 of Figure 5. Figure 8 is a rear elevation of the bumper element as seen from line 8—8 of Figure 5. Figure 9 is a central vertical section on line 9—9 of Figure 5. Figure 10 is a section on either of the two lines 10—10 of Figure 5.

In Figure 1 the corner bumper assembly of the present invention is shown as applied to a table top 1 of wood or the like which table top is supported by legs 2, each provided at its lower end with a caster assembly 3. Table top 1 has abruptly angled corners and, at each corner, a correspondingly angled corner bumper assembly generally designated 4. Two such corner bumper assemblies are shown in Figure 1. As will appear below, each of these corner bumper assemblies comprises a unitary bumper element generally designated 5 which is supported by a unitary mounting member generally designated 6. These parts are shown in Figure 4 and Figure 3, respectively, and, in the case of bumper element 5, also in subsequent figures.

Mounting member 6 is channel-shaped as seen from either end or in vertical cross section, being formed of a rigid channel-like member characterized by a plane base 7, side walls 8 and 9 extending substantially at right angles thereto, and inturned positioning flanges 10 and 11 which form right angles with side walls 8 and 9. Positioning flanges 10 and 11 project toward and thus oppose each other along the outer portions of side walls 8 and 9, respectively. In the form shown, mounting member 6 is made of metal by taking a straight piece of suitably formed metal stock, slitting inturned flanges 10 and 11 and side walls 8 and 9 transversely thereof at corresponding points on opposite sides of base 7, and bending the two ends of base 7 rearwardly about bend line 12 to form dihedral angle $a$. Angle $a$ may be as large or small as necessary but ordinarily will measure approximately 90°, this so that mounting member 6 may conform to the corner structure of a conventional square-cornered table top. Where angle $a$ measures 90°, the angles $b$ which are opened up as recesses or relieved portions in side walls 8 and 9 likewise measure 90°; that is to say, each may be considered to define a quadrantal sector. Base 7 of mounting member 6 is provided with a plurality of openings 13 by which, with the aid of screws 14, mounting member 6 is applied to edge 15 of table top 1 as shown in Figure 2.

Bumper element 5 conforms closely in shape to mounting member 6, included angle $c$ of the former being of the same magnitude as angle $a$ of the latter. As best apears from Figures 4, 8 and 10, bumper element 5 comprises a pair of elongated positioning strips 16 and 17 separated by an elongated triangular void 18 and, bridging it on the anterior side of the bumper element, a protuberant bumper strip formed integrally with positioning strips 16 and 17. Like the latter, the bumper strip extends as indicated in Figure 4 from a guard flange 19 at the left-hand end of bumper element 5 to a guard flange 20 at the right-hand end of bumper element 5. Formed integrally with the bumper strip and with positioning strips 16 and 17 are two quadrantal lugs 21 and 22 (Figures 7 and 8) which correspond in shape and position to recesses $b$ in mounting member 6. Between them, where the bumper strip encompasses dihedral angle $a$ in mounting member 6, the bumper strip is of massive proportions, having the semi-cylindrical contour indicated at 23. Flanking portions 24 and 25, which at their adjacent ends are faired into cylindrical portion 23 as best shown in Figures 4 and 7, are rounded at their opposite ends as indicated at 24a and 25a, respectively.

The proportions and dimensions of bumper element 5 correspond to those of mounting member 6, this so that bumper element 5 and mounting member 6 may be assembled together to give a corner bumper assembly of the kind shown in Figure 1.

As therein shown, positioning flanges 10 and 11 of mounting member 6 overlie the corresponding portions of bumper element 5; that is to say, positioning strips 16 and 17. The latter are shaped to conform to the spaces immediately underlying positioning flanges 10 and 11, being square-shouldered along their outside edges as indicated in Figures 4 and 10. Guard flanges 19 and 20 project laterally from positioning strips 16 and 17 as best indicated in Figures 4, 7 and 8, this so that when positioning strips 16 and 17 are located in the spaces which underlie positioning flanges 10 and 11 of mounting member 6, guard flanges 19 and 20 will serve to conceal the ends of side walls 8 and 9 and positioning flanges 10 and 11. Quadrantal lugs 21 and 22 serve a similar purpose, rising above and below the cylindrical portion 23 of the bumper strip to occupy the quadrantal sectors defined by recesses $b$ in side walls 8 and 9. Thus lugs 21 and 22 conceal from view the adjacent ends of side walls 8 and 9 and positioning flanges 10 and 11, such ends being formed when the slits are made therein preparatory to introducing dihedral angle $a$ into mounting member 6.

In bumper element 5 the shape of the exposed face of the bumper strip which extends from guard flange 19 to guard flange 20 and which bridges the triangular void 18 separating positioning strips 16 and 17 may of course be varied within very wide limits. In the embodiment of the invention shown in the drawings, the bumper strip has over most of its length the half-round appearance most clearly indicated in Figures 4, 7 and 10; however, it could equally well have any other suitable contour. End portions 24a and 25a need not necessarily be rounded as shown in Figures 4, 5 and 7, but, in common with flanking portions 24 and 25, may have some other contour. While it is advantageous to reinforce the bumper strip by a cylindrical portion 23 of massive proportions where the bumper strip encompasses the dihedral angle $a$ in mounting member 6, it is not necessary that the reinforcement take the semi-cylindrical form shown in Figures 4, 5 and 7. Any other form that serves to provide an extra quantity of material adjacent the corner in the table top may be employed instead.

Bumper element 5 and mounting member 6 are designed to cooperate to form a unit as indicated in Figure 1. As there shown, those portions of edge 15 of table top 1 which lie between the ends of adjacent corner bumper assemblies 4 are intentionally left devoid of protective elements. If, however, it is desired to fill in the spaces between such corner bumper assemblies, it is only necessary to cut bumper element 5 on the transverse planes represented by lines 10—10 in Figure 5, which will give a squared-off appearance to the ends of the bumper element. By locating supplemental mounting members of suitable size in the gap between the squared-off ends, it becomes a possible to introduce into the gap a longitudinally extending bumper element that is squared off at its ends to mate with the squared-off ends of bumper element 5. In such case, the longitudinally extending bumper elements will of course be of lengths sufficient to permit them to enter into the near ends of mounting members 6 of corner bumper assemblies 4.

Preferably, positioning strips 16 and 17, guard flanges 19 and 20, quadrantal lugs 21 and 22, cylindrical portion 23 and flanking portions 24 and 25 are formed integrally with each other of rubber or a rubber-like material, the entire bumper element being molded at the same time from the same compound in a single operation. Natural rubber having a durometer hardness of from 50 to 65 has been found to be suitable for the purpose. Non-marking gray rubber is particularly useful. If desired, however, wholly synthetic materials such as synthetic rubber, synthetic resins, etc. may be used instead. The chemical nature of the composition is not important so long as the bumper element as a whole is substantially flexible, particularly in those portions that comprise positioning strips 16 and 17.

Application of bumper element 5 to mounting member 6 to form corner bumper assembly 4 is accomplished by bringing bumper element 5 into that relationship with mounting member 6 in which guard flange 19 on bumper element 5 immediately adjoins the left-hand end of mounting member 6 as seen in Figure 3 and the balance of bumper element 5 lies forward of but closely adjacent to mounting member 6. With the parts in these relative positions, the left-hand half of lower positioning strip 17 is slipped into place behind positioning flange 11 and, at the same time, downwardly extending lug 22 is located in the quadrantal recess $b$ formed between adjacent ends of side walls 9 near the base of dihedral angle $a$. Using a wide screw driver or some similar tool that can be applied to the left-hand half of upper positioning strip 16, the bumper strip is compressed by closing or substantially closing the triangular bight 18 which separates positioning strips 16 and 17 from each other. When triangular bight 18 has been closed in this manner,. the left-hand end of positioning strip 16 can be slipped in behind positioning flange 10, thereby securing in place the entire left-hand half of bumper element 5 as seen in Figure 4.

After upwardly extending lug 21 moves or is moved into place in the quadrantal recess $b$ formed between adjacent ends of side walls 8 near the top of dihedral angle $a$, the operation is continued by working from lugs 21 and 22 toward guard flange 20. This is done by slipping the right hand half of lower positioning strip 17 into place behind positioning flange 11 and, after compressing the right-hand half of upper positioning strip 16 against lower positioning strip 17, forcing the right-hand half of upper positioning strip 16 into place behind positioning flange 10. This having been done, guard flange 20 at the right-hand end of bumper element 5 falls naturally into place at the extreme right-hand end of mounting member 6 as seen in Figure 3. The entire bumper element is thereby held firmly in place.

Removal of bumper element 5 is accomplished by grasping guard flange 19 or 20 and pulling first the upper and then lower positioning strip out from behind the corresponding positioning flange, continuing from one end of the assembly to the other until complete removal of the bumper element has been effected.

With bumper element 5 firmly held to mounting member 6, corner bumper assembly 4 operates much as does any other corner bumper assembly. If the material of which the bumper element is made is compounded of gray rubber or some equivalent material, there is no marking of walls and woodwork when contact is made with them. Partly because of the fact that it is heavily reinforced at those points which tend to come into contact with walls and woodwork, bumper element 5 has a long useful life. The construction of bumper element 5 and mounting member 6 eliminates the possibility of marring of walls and woodwork by exposed metal mounting channels, screws and the like, which in corner bumper assemblies of the type heretofore known have not been so completely covered over by the bumper element. If, as shown in Figure 2, mounting member 6 is held in place by concealed screws, bumper element 5 is devoid of mounting holes, screws, screw heads, etc. Thus the entire assembly presents a smooth, unbroken, attractive appearance not heretofore found in corner bumper assemblies.

It is intended that the patent shall cover, by summarization in the appended claims, all of the features of patentable novelty that characterize the invention.

What is claimed is:

1. A corner bumper assembly comprising a channel member the base of which is angled in such manner that the apex of the angle extends transversely of the run of the channel, in which the sides of the channel extend away from the sides of the angle formed in the base, and in which positioning flanges project laterally from the outer edges of the sides of the channel and, cooperating therewith, a bumper element comprising a first positioning strip of resilient material, a second positioning strip of resilient material separated therefrom by a void, and, bridging them, a bumper strip of resilient material, massive proportions and solid cross-section extending from one end to the other of the bumper element, that portion of the bumper element made up of the positioning strips being angled to conform to the angle in the channel member and having at its extreme outer ends laterally projecting guard flanges for concealing the ends of the channel member the major surfaces of which guard flanges extend perpendicularly to the central plane of the bumper assembly as a whole.

2. A corner bumper element comprising a plurality of parallel positioning strips of resilient material separated from each other by an elongated triangular void and, bridging them, a bumper strip of resilient material, massive proportions and solid cross-section extending from one end to the other of the bumper element, that portion of the bumper element comprised of the positioning strips being abruptly angled to conform to the shape of an abruptly angled corner, that portion of the bumper element comprised of the bumper strip having a generally cylindrical outer face where it encompasses the abruptly angled portion of the bumper element, and those portions of the bumper element made up of the outer ends of the bumper and positioning strips being formed as laterally projecting guard flanges of which the major surfaces extend perpendicularly to the central plane of the bumper element as a whole.

3. A corner bumper element as in claim 2 characterized by the presence of resilient lugs that extend above and below the cylindrical portion of the bumper strip.

4. A corner bumper element as in claim 3 in which the lugs are quadrantal in shape.

References Cited in the file of this patent

UNITED STATES PATENTS

| Number | Name | Date |
| --- | --- | --- |
| 1,761,233 | Roe | June 3, 1930 |
| 1,935,718 | Johnson | Nov. 21, 1933 |
| 2,004,722 | Hamm | June 11, 1935 |
| 2,102,578 | Gail | Dec. 14, 1937 |